United States Patent [19]

Rouse et al.

[11] Patent Number: 5,428,749
[45] Date of Patent: Jun. 27, 1995

[54] EVENT SIGNALLING SYSTEM AND METHOD FOR PROCESSOR SYSTEM HAVING CENTRAL MEMORY UNIT

[75] Inventors: Keith Rouse, Oxford; Terry F. Montlick, Bethlehem, both of Conn.

[73] Assignee: Star Semiconductor Corporation, Warren, N.J.

[21] Appl. No.: 59,510

[22] Filed: May 7, 1993

Related U.S. Application Data

[60] Continuation of Ser. No. 583,508, Sep. 17, 1990, abandoned, which is a division of Ser. No. 525,977, May 18, 1990, abandoned.

[51] Int. Cl.⁶ ................. G06F 13/00; G06F 15/163
[52] U.S. Cl. ................. 395/275; 364/942.05; 364/260.1
[58] Field of Search ............... 395/800, 200, 250, 275, 395/425, 725

[56] References Cited

U.S. PATENT DOCUMENTS

| | | | |
|---|---|---|---|
| 3,815,104 | 6/1974 | Goldman | 364/200 |
| 4,435,759 | 3/1984 | Baum | 364/200 |
| 4,477,873 | 10/1984 | McGarley | 364/200 |
| 4,860,192 | 8/1989 | Sachs et al. | 364/200 |
| 5,150,313 | 9/1992 | van den Engh et al. | 395/800 |
| 5,210,862 | 5/1993 | DeAngelis | 395/575 |

Primary Examiner—David Y. Eng
Attorney, Agent, or Firm—David P. Gordon

[57] ABSTRACT

An event signalling system is provided for a digital signal processor apparatus which has a central data RAM, at least one computing processor, each computing processor having event occurrence circuitry, a plurality of data I/O processors, and a data RAM bus coupled to the data RAM, the computing processor(s) and the I/O processors. The event signalling system includes an address code generating circuit in each data I/O processor for generating different predetermined address codes for each I/O processor and for writing the predetermined address codes onto the data RAM bus upon the occurrence of events of interest. The occurrence of the predetermined address codes on the data RAM bus. are monitored by an address decoder which generates different signals depending upon the predetermined address code found. The signals from the address decoder are carried by a flag bus to the event occurrence circuitry of the computing processor(s), and to the output sections of the I/O processors.

23 Claims, 8 Drawing Sheets

FIG. 2

| CYCLE | 1 | 2 | 3 | 4 | 5 |
|---|---|---|---|---|---|
| gsp 1 | p-rd | | d-rd/wr (p-wr) BOOT MODE | | |
| gsp 2 | | p-rd | | d-rd/wr | |
| gsp 3 | | | p-rd | | d-rd/wr |
| gsp 4 | d-rd/wr | | | p-rd | |
| HOST/ ACCESSPORT/ SERIAL INPUTS/ SERIAL OUTPUTS/ da INPUT/ da OUTPUT | | d-rd/wr d-rd/wr d-wr d-rd d-wr d-rd | | | p-rd/wr p-rd/wr |

50 MHz clock signal shown above cycles.

TO FIG. 5B

EVENT SIGNALLING SYSTEM AND METHOD FOR PROCESSOR SYSTEM HAVING CENTRAL MEMORY UNIT

This application is a continuation of application Ser. No. 07/583,508, filed Sep. 17, 1990, now abandoned, which in turn is a divisional application of Ser. No. 07/525,977 filed May 18, 1990, now abandoned and continued as co-pending application Ser. No. 07/900,536 filed Jun. 18, 1992, the complete disclosure of which is hereby incorporated herein by reference.

BACKGROUND OF THE INVENTION

The present invention relates to event signalling systems and methods for digital signal processor systems. More particularly, the present invention relates to systems and methods for signalling the occurrence of events to one or more computing processors, where data flow into and out of a digital signal processor system is substantially through a data RAM and is independent of the one or more computing processors.

Digital signal processing has evolved from being an expensive, esoteric science used primarily in military applications such as radar systems, image recognition, and the like, to a high growth technology which is used in consumer products such as digital audio and the compact disk. Single chip digital signal processors (SCDSPs) were introduced in the early 1980's to specifically address these markets. However, SCDSPs are complex to design and use, and have significant development, environment, and performance limitations which stem from their Von Neuman, microprocessor origins. In particular, while the requirements of signal processing are that the signal processor be computationally intensive and controllable, have low latency and low parasitic overhead for real time I/O, and be able to efficiently execute multiple asynchronous processes, the signal processors of the art are burdened with the interrupt structures and the memory intensiveness of their microprocessor ancestors. The interrupt structures found in the SCDSPs of the art typically result in the SCDSPs being limited to a frequency spectrum from DC to the low tens of KHz.

In overcoming the problems of the SCDSPs of the art, a digital signal processor (also referred to as a "SPROC") architecture was set forth in parent application Ser. No. 07/525,977 filed May 18, 1990, now abandoned and continued as co-ending application Ser. No. 07/900,536 filed Jun. 18, 1992, where the interrupt structure and tasks are substantially removed from the tasks of the computing processor(s) (e.g. the GSPs). The separation is achieved by providing a central memory unit (data RAM) through which flows substantially all the data coming into and out of the signal processor, and by providing a data flow manager (i.e. a data I/O processor) which handles I/O between the central memory unit and the "outside" world. The computing processor(s) is coupled to the central memory unit and does not communicate directly with the outside world. Where multiple computing processors are utilized, the multiple processors do not communicate directly; rather they communicate via the central memory unit. However, even though the computing processors are shielded from the I/O functions of the SCDSP and are therefore capable of increased throughput, a mechanism for informing (signalling) the computing processors of events of interest such as the availability of desired information must be provided.

SUMMARY OF THE INVENTION

It is therefore an object of the invention to provide event signalling systems and methods for a digital signal processor which has its computing processor substantially separated from its data input/output circuitry.

It is another object of the invention to provide event signalling systems and methods for a digital signal processor which utilizes a central memory unit for separating it computing functions from its data I/O functions.

It is a further object of the invention to provide event signalling systems and methods for a digital signal processor employing a plurality of computing processors.

In accord with the objects of the invention, an event signalling system is provided for a digital signal processor apparatus which has a central data RAM, a computing processor having an event occurrence circuitry, a data I/O processor, and a data RAM bus coupled to the data RAM, the computing processor and the I/O processor. The event signalling system includes: an address code generating circuit in the data I/O processor for generating a predetermined address code and for writing the predetermined address code onto the data RAM bus upon the occurrence of an event of interest; a data RAM bus address decoder for monitoring the data RAM bus for predetermined address codes, and for generating a signal when a predetermined address code is written to the data RAM; and a flag bus coupled to the event occurrence circuitry of the computing processor for transmitting the signal generated by the data RAM bus address decoder to the event occurrence circuitry. In the preferred embodiment, the computing processor also includes an address code generating means for signalling the occurrence of an event of interest, and access to the data RAM bus from the data I/O processor and the computing processor is time division multiplexed. Where the data RAM is a true multiported data RAM (as opposed to being multiported by requiring that the data RAM bus be time division multiplexed), and the I/O processor and the computing processor have direct access to the data RAM from different data RAM buses, each data RAM bus is monitored by the data RAM bus address decoder.

The event signalling system is preferably utilized in conjunction with a digital signal processor apparatus having a plurality of data I/O processors, where each data I/O processor is coupled in a time division multiplexed manner to the data RAM bus, and each data I/O processor has an address code generating circuit which generates a different predetermined address code. In such a system, the data RAM bus address decoder monitors a plurality of predetermined addresses, and the flag bus is preferably a parallel bus. Where the event signalling system is utilized with a digital signal processor apparatus having a plurality of computing processors all coupled to the data RAM bus in a time division multiplexed manner, each computing processor preferably has event occurence circuitry (e.g. a resettable register) which is coupled to the flag bus, and address code generating means coupled to the data RAM bus.

Additional objects and advantages of the invention will become evident upon reference to the detailed description taken in conjunction with the provided figures.

BRIEF DESCRIPTION OF THE DRAWINGS

FIG. 2 is a timing diagram of the access of the various components of the digital signal processor to the "multiported" data RAM via the time division multiplexed data RAM bus.

DETAILED DESCRIPTION OF THE PREFERRED EMBODIMENTS

Figure 1:
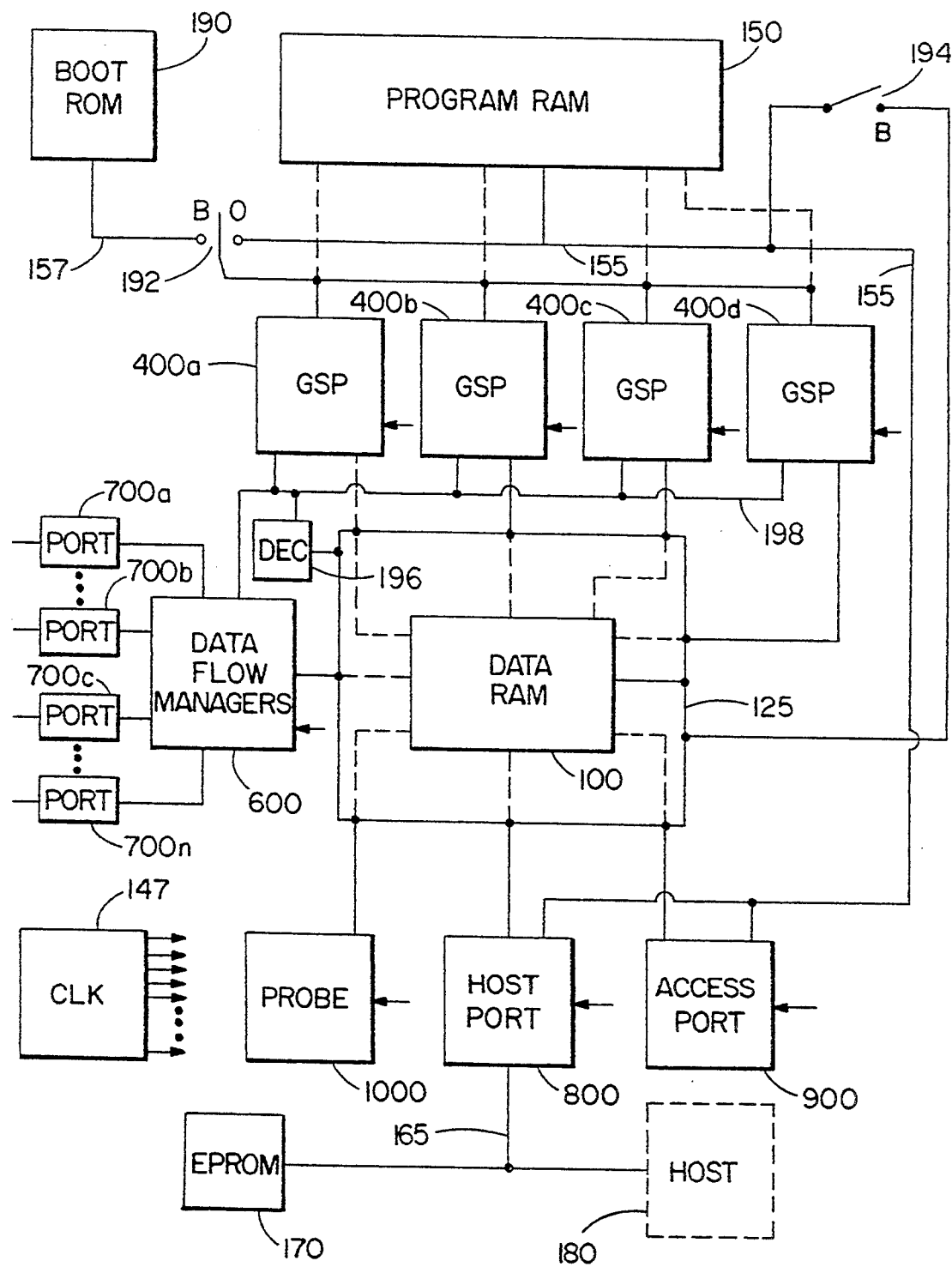
FIG. 1 is a high level block diagram of a preferred digital signal processor having data flow managers, computing processors, a central data RAM and data RAM bus, and a data RAM bus decoder in which the event signalling system is embodied.

A high level block diagram of the preferred digital signal processor 10 in which the event signalling system of the invention is embodied is seen in FIG. 1. The preferred digital signal processor 10 includes: a central "multiported" data RAM 100 accessed via a time division multiplexed data RAM bus 125; a "multiported" program RAM 150 accessed via a time division multiplexed program RAM bus 155; a plurality of internal computing processors (GSP) 400 which are coupled to the data RAM bus 125 and the program RAM bus 155 and which perform general processing functions; a plurality of data flow managers (I/O processors or DFM's) 600 which are coupled to the data RAM bus 125 and which generally control the flow of data into and out of the digital signal processor 10 and relieve the GSPs from dealing with that data flow; a plurality of serial data ports 700 which are coupled to the DFMs 600; a host port 800 coupled to both the data RAM bus 125 and the program RAM bus 155, the host port serving to couple the SPROC via the host bus 165 to either an EPROM 170 in stand-alone mode or to a host processor 180 in host mode; an access port 900 coupled to both the data RAM bus 125 and the program RAM bus 155; a probe 1000 coupled to the data RAM bus 125; an internal boot ROM 190 with boot ROM bus 157 coupled via switch 192 to a GSP 400, the boot ROM 190 being used to control a master digital signal processor in start-up mode, as well as to control the GSPs 400 of the digital signal processor when the GSPs are in break mode; a data RAM bus address decoder 196 coupled to the data RAM bus 125 for decoding when certain particular addresses of the data RAM 100 are being addressed, and for generating signals in response thereto; and a twenty bit wide flag bus 198 coupled to the decoder 196 and to the GSPs 400, and if desired the DFMs, for carrying the signals (flags) generated by the flag generating data RAM address bus decoder 196 to the GSPs and DFMs. Details of the functioning of the digital signal processor in its various modes, as well as the functioning of the components of the digital signal processor, may be found by reference to parent application Ser. No. 07/525,977, now abandoned and continued as U.S. Ser. No. 07/900,536. Only those details of the data RAM 100 and data RAM bus 125, the GSPs 400, and the DFMs which are particularly relevant to the event signalling system of the invention are repeated herein.

The data RAM 100 is effectively multiported by causing access to the data RAM bus 125 to be time division multiplexed. As indicated in FIG. 2, each GSP 400 is given a single time slot to either read from or write to the data RAM 100. The fifth time slot (time slot 2) is subdivided in time as follows: 50% for the host interface; and the remaining fifty percent equally. divided among the access port 900, each of eight DFMs 600, and the probe 1000.

The RAMs 100 and 150 of the invention are preferably separate RAM devices and do not share memory space. For example, the program RAM 150 is preferably a 1K by 24 bit RAM which is assigned address locations 0000 to 03ff Hex. The data RAM 100, on the other hand is preferably a 3K by 24 bit data RAM with primary data RAM space of 2K assigned address 0800 to 0fff Hex, and auxiliary register based space of 1K assigned addresses 0400 to 07ff Hex. Of the primary data RAM addresses, addresses 0800 through 0813 Hex relate to the event signalling system. Eight of the those particular addresses are used by the eight DFMs to signal that the DFM has filled a buffer in the data RAM with data, as described in more detail hereinafter. The remainder of addresses 0800 through 0813 Hex may be used by the GSP computing processors 400 or by other components of the digital signal processor 10.

Figure 3A:
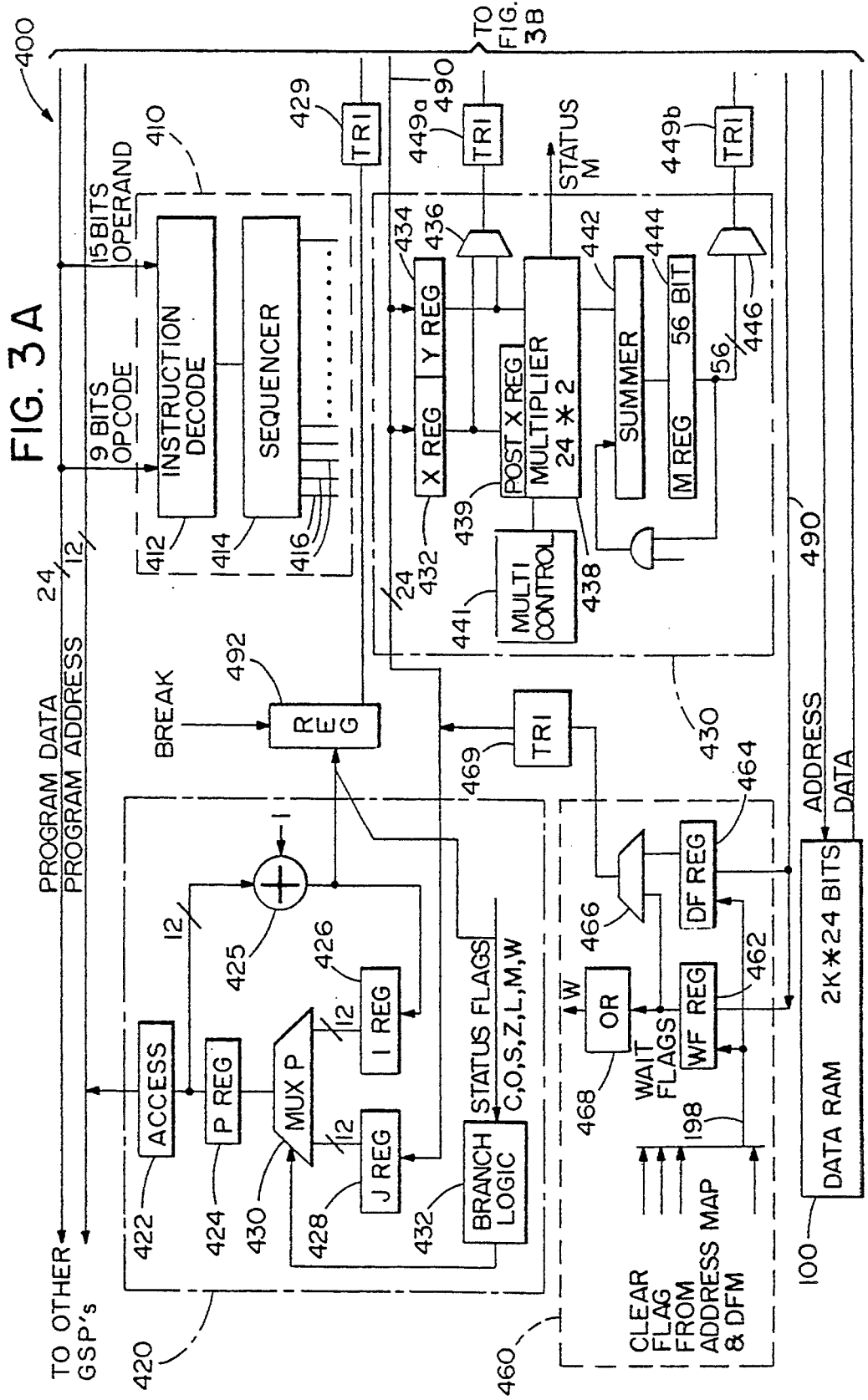
FIGS. 3A and 3B is a partial block diagram of the computing processors (GSPs) of the digital signal processor in which the event signalling system is embodied.
Figure 3B:
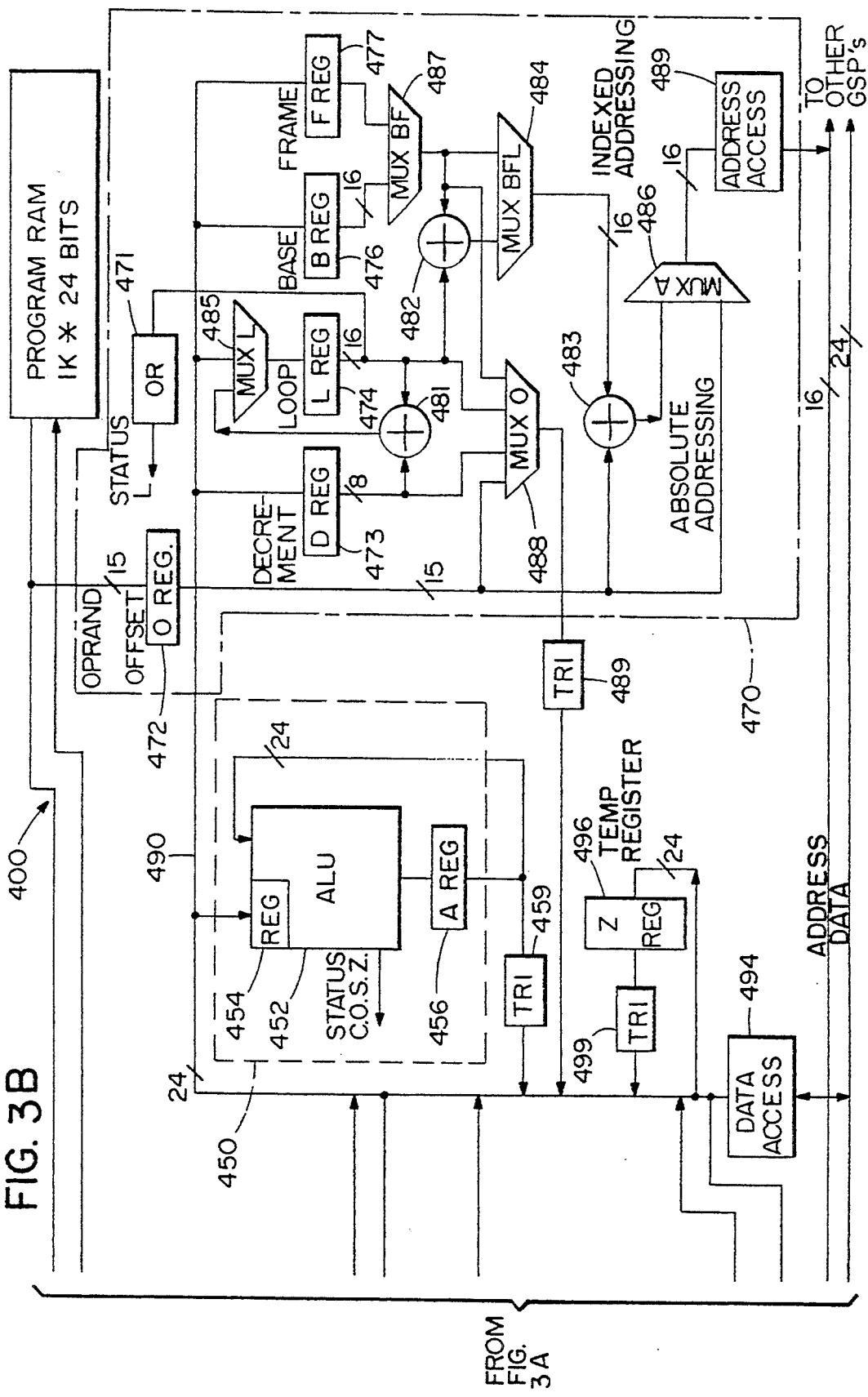

Turning to FIGS. 3A and 3B, the computing processors (GSPs) 400 are substantially described by the details and functioning of six sections: a block controller 410; a program control logic block 420; a multiplier block 430; an ALU block 450; a flag or event occurrence block 460; and a data RAM address generator block 470. Coupling all six sections, as well as a break register 492, a data access register 494, and a temporary register 496 is an internal twenty-four bit bus 490. All access from any of the sections or from the registers 492, 494, or 496 onto the internal bus 490 is via tristate drivers 429, 449a, 449b, 459, 469, 489, and 499.

Block controller 410 is comprised of instruction decoder 412, and sequencer 414. The instruction decoder 412, when enabled, takes fourteen bits (nine bits of opcode, and five bits of operand) off of the data portion of the program RAM bus 155. Six of the nine opcode bits are used to indicate the operation (instruction) which the GSP is to perform (e.g. add, shift, jump, etc.), with up to sixty-four instructions being accommodated. In the preferred embodiment an additional three bits of opcode are utilized to specify the addressing mode the GSP is to use. In particular, in the "absolute" mode (code 000), the fifteen bits in the 0 register 472 of the address generator block 470 are used to select an address in the data RAM 100, and the data in that address of data RAM is used for the operation. In the "register" mode (code 001), the five operand bits obtained by the instruction decoder 412 are used to specify which register of the numerous registers of the GSP is to place its contents onto the internal bus 490. In the "immediate left" mode (code 010), the fifteen bits of data in the 0 register are to be put into the fifteen msb slots of the internal bus 490, while in the "immediate right" mode (code 011), the fifteen bits are put into the fifteen lsb slots of the internal bus. In the remaining four modes, "BL indexed" (code 100), "B indexed" (code 101), "FL indexed" (code 110), and "F indexed" (code 111), as described in more detail hereinafter, values in base registers B or F are added to the value of the fifteen bit operand stored in the O register and, where appropriate, to the value in the L (loop) register, and are output onto the data RAM bus 125.

Instruction decoder 412 is not only coupled to the program RAM bus, but to the numerous multiplexers, tristate drivers, registers, etc. of the GSP via lines 416. Based on the instruction which is decoded by instruction decoder 412, various of those lines 416 are enabled in a sequence as determined by the sequencer 414. In effect, instruction decoder 412, and sequencer 414 are simply look-up charts, with instruction decoder 412 looking up which lines 416 must be enabled based on the code found in the nine bits of opcode, and sequencer 414 looking up the sequence to which the enabled lines must subscribe.

While instruction decoder 412 decodes whatever instruction is on the program RAM bus 155 when the GSP 400 is granted access to that bus, the instruction which is on the bus is generated and dictated by the program logic block 420. Program control logic block 420 is comprised of a tristate driver 422, a program address value register 424 (also called the "P" register), an incrementer 425, an increment (I) register 426, a jump (J) register 428, a multiplexer 430, and a branch logic block 432. The P register 424 contains the location of the program RAM 150 which contains the microinstructions which are to be used by the GSP 400. P register 424 writes that address onto the program RAM bus 155 by sending it to tristate driver 422 which acts as the bus interface.

Updating of the P register 424 is accomplished via muxP 430 which chooses one of the twelve bit addresses stored in the I register 426 or the J register 428 based on information from branch logic block 432. The address stored in the I register is simply the next numerical address after the address stored in the P register, as a value of one is added at incrementer 425 to the value stored in P register 424. In most situations, muxP 430 will permit the P register 424 to be updated by the I register, and the sequential addressing of the program RAM will continue. However, in some situations, such as where a jump in the routine is desired, the multiplexer 430 will permit the address in the J register 428 to be loaded into the P register 424. The decision to jump is made by the branch logic block 432 which reads the status of a plurality of status flags as is hereinafter discussed. The address to which the jump is made is obtained by the J reg 428 from the internal bus 490, which may obtain the address from any of the sections of the GSP 400 (or from the data RAM 100).

Details regarding the multiplier block 430 and the ALU block 450 may be had with reference to parent patent application Ser. No. 07/525,977.

The wait flag block 460 (also referred to as the event occurrence circuitry) is comprised of two wait flag registers WFreg 462 and DFreg 464, a multiplexer 466, and OR gate 468. The bits of the wait flag registers are typically set (i.e. written to) by data sent over the internal bus 490. Also, registers WFreg 462 and DFreg 464 are coupled to a flag bus 198 which is written to each time predetermined locations in the data RAM 125 are addressed as will be described in more detail hereinafter. In this manner, each bit of the wait flag registers 462 and 464 may be selectively cleared. When all of the bits in register WFreg 462 have been cleared due to the occurrences of specified events (e.g. the data RAM has received all the information which is required for another computation by the GSP), OR gate 468 is used to provide a status flag W which indicates the same. Status flag W is read by the branch logic block 432. In this manner, "jump on wait flag" commands may be executed.

The DFreg 464 of the wait flag block 460 functions similarly to the the WFreg 462, except that no signals indicating the presence of all zeros (or ones) are output by the DFreg. In order to check the contents of the DFreg (or the WFreg, if all values in the WFreg are not zero), the register must be selected to put its contents on the internal bus 490. The selection of one of the registers is made by the instruction decode 412 and sequencer 414, and the contents are forwarded via multiplexer 466 and the tristate driver 469. An easy manner of determining whether the DFreg 464 has all zeros is to forward the contents of the DFreg 464 to the ALU 452, which will provide a status flag Z if the contents are zero.

In the preferred embodiment, the WF and DF registers of the wait flag block 460 also include bits which are cleared by "compute lines" (not shown) which function in a similar manner to the wait flag bus 198. The compute lines are preferably coupled to hardware pins (not shown) and are useful in providing external timing information to the GSPs 400 and the DFMs 600 of the digital signal processor 10.

The final large block of the general signal processor is the data RAM address generator block 470 which includes bus wide OR gate 471, registers Oreg 472, Dreg 473, Lreg 474, Breg 476, Freg 477, adders 481, 482, and 483, multiplexers muxBFL 484, muxL 485, muxA 486, muxBF 487, muxO 488, and an address access block 489. As previously indicated, the Oreg 472 obtains the fifteen least significant bits of the instruction on the program RAM bus. If "absolute" addressing is desired, i.e. the address to be written onto the data RAM bus is included in the program RAM microinstruction itself, the address is written into the Oreg 472, and then forwarded to the data RAM bus (a sixteenth bit having been added by a zero extender, not shown) via muxA 486 and the address access block 489. The sixteen bit address is then placed on the data RAM bus at the appropriate time. All other situations constitute "indexed" addressing, where the address to be put out on the data RAM bus is generated internally by the data RAM address generator block 470.

Addresses are generated by adding the values in the various registers. In particular, and as indicated in FIG. 3, the Oreg 472 is the offset register, the Dreg 473 is a decrement register, the Lreg 474 is a loop register which sets the length of a loop, the Breg 476 is a base address register, and the Freg 477 is a frame address register which acts as a second base address register. The O register obtains its data off of the program RAM bus, while registers D, L, B and F obtain their data from the internal bus 490. If it is desired to add some offset value to the value in the base or frame register (i.e. the "B indexed mode" or "F indexed mode") in order to generate an address, muxBF 487 selects appropriately the Breg 476 or the Freg 477, muxBFL 484 selects the value coming from muxBF 487, and the Breg or Freg value is added to the offset value of the Oreg by the adder 483. That value is then selected by muxA 486 for output over the data RAM bus via the address access block 489. Similarly, if it is desired to add some offset value and some loop value to the value in the base or frame register (i.e. the "BL indexed mode" or the "FL indexed mode"), the value in the L register is added to the value in the B or F registers at adder 482, and the sum is passed via muxBFL 484 to adder 483 which adds the value to the value in the 0 register.

By providing adder 481, and by coupling the decrement register Dreg and the loop register Lreg to the adder 481, registers an address loop is effectuated. In particular, the Lreg sets the length of the loop, while the Dreg sets the value by which the loop is decremented. Each time the Dreg is subtracted from the Lreg 475 at adder 481, the new value is fed back into the Lreg 475 via muxL 485. Thus, each time a DJNE instruction is executed (as discussed below), the resulting value in the Lreg is decreased by the value of the Dreg. If added to the Breg or Freg, by added 482, the address generated is a sequentially decrementing address where the value in the Dreg is positive, and a sequentially incrementing address where the value in the Dreg is negative.

The ability to loop is utilized not only to provide a decrementing (or incrementing) address for the data RAM bus, but is also utilized to effect changes in the program RAM address generation by providing a "decrement and jump on not equal" (DJNE) ability. The output from the adder 481 is read by OR gate 471 which provides a status flag L (loop) to branch logic block 432. The status flag L maintains its value until the L register has looped around enough times to be decremented to the value zero. Before that point, when the Lreg is not zero, the next instruction of the GSP is dictated by the instruction indicated by the Jreg 428. In other words, the program jumps to the location of the Jreg instruction instead of continuing with the next instruction located in the I register. However, when the Lreg does decrement to the value zero, the OR gate 471 goes low and toggles flag L. On the next DJNE instruction, since the "not equal" state does not exist (i.e. the Lreg is zero), branch logic 432 causes muxP 430 of the program logic block 420 to return to obtaining values from the Ireg 426 instead of from the Jreg 428, and the program continues.

The values of any of the O, D, L, B, or F registers may be placed on the internal bus 490, by having muxO 488 (and where appropriate mux BF 487) select the appropriate register and forward its contents via tristate driver 489 to the internal bus.

Coupled to the internal bus 490, and interfacing the internal bus 490 with the data slots on the data RAM bus is the data access port 494. The data access port 494 is capable of reading data from and writing data to the data RAM and is given access to the data RAM in a time division multiplexed manner as previously described. In writing to the data RAM, the data access port 494 and the address access port 489 are activated simultaneously. In reading data from the RAM, the address access port 489 first places on the data RAM bus the data RAM address in which the desired data is stored. The data is then placed on the data RAM bus by the data RAM, and the data access port 494 which is essentially a dual tri-state driver, receives the data and passes it onto the internal bus 490 for storage in the desired GSP register.

It will be appreciated that the data RAM address generator block is capable of generating any desired address, including those addresses which are monitored by data RAM bus address decoder 196. While the generation of a monitored address is not hardwired so as to be automatic upon the occurrence of given events, the code contained in the program RAM 150 can be arranged to effectuate the monitored address generation at desired times. Thus, if it is desirable for a GSP to signal to other GSPs, the DFMs, or other circuits the occurrence of an event (e.g. the completion of a particular calculation), the program RAM causes the GSP to have its data RAM address generator block 470 generate one of the addresses 0800 to 0813 Hex; the generated address not being one of the addresses generated by the DFMs 600 as discussed below.

Figure 4A:
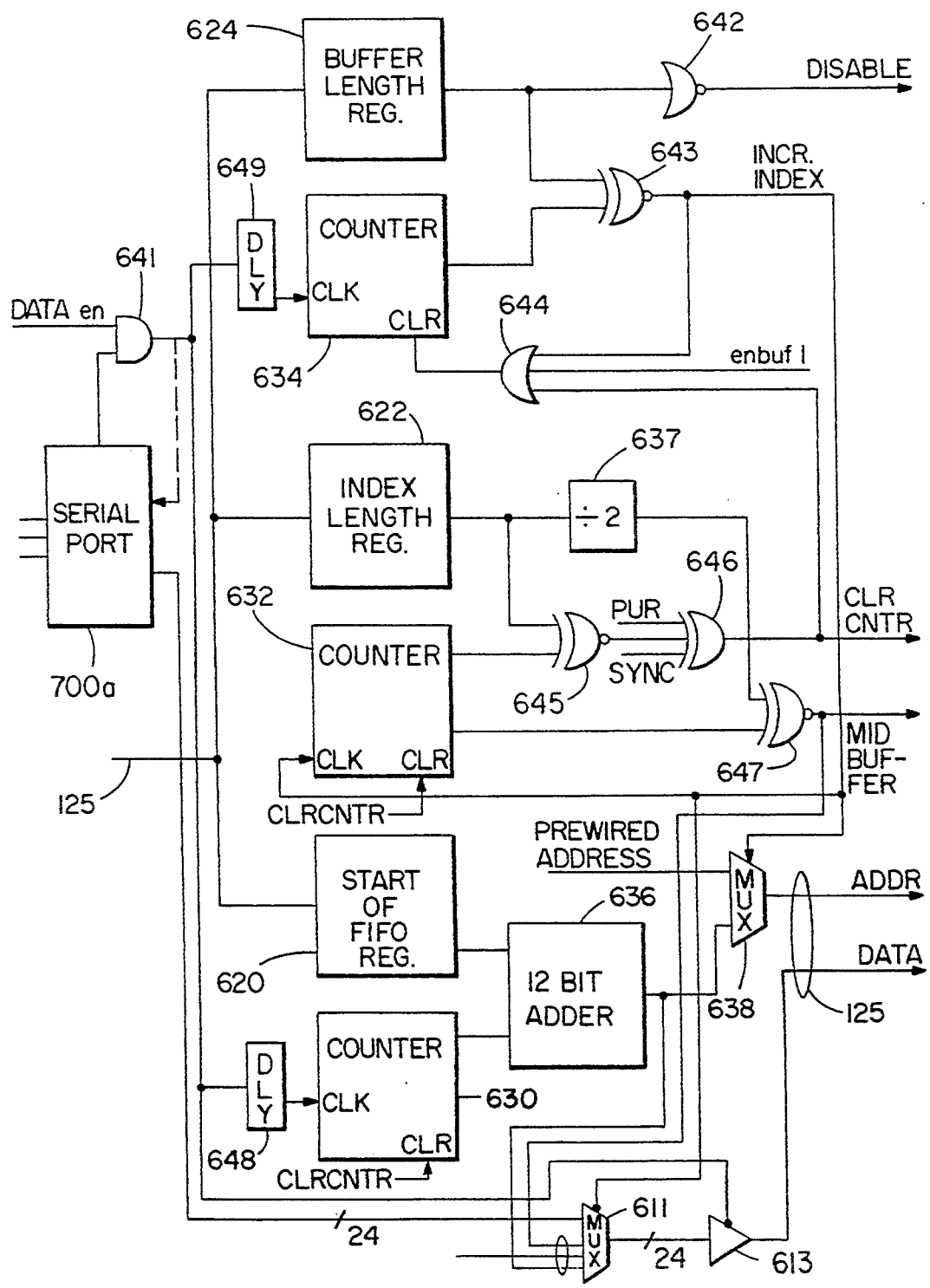
FIG. 4a block diagram of the input side of the I/O processor (data flow manager) which includes an address code generating circuit.
Figure 4B:
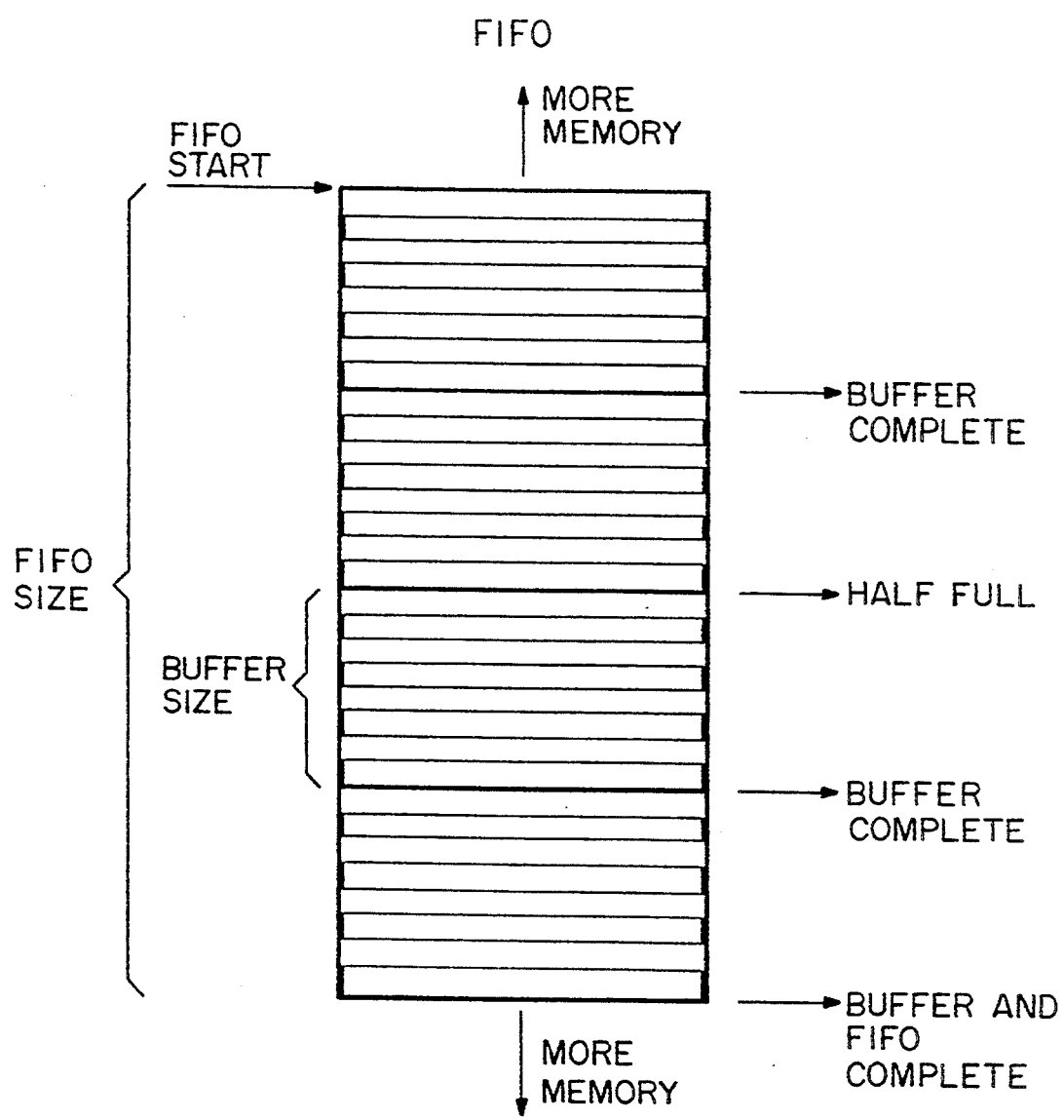
FIG. 4b presentation of a FIFO which is implemented in the multiported data RAM, and which is utilized by the I/O processor.

Turning to FIGS. 4a and 4b, a block diagram of the input circuitry of the I/O processor (DFM) 600 is seen, as is an example FIFO which relates to the DFM. The DFM 600 serves the important function of handling the flow of data into and out of the processor apparatus so that GSPs of the processor apparatus need not be interrupted in their processing tasks. In accomplishing this function, the DFM takes data received by the serial port from the "world" outside of the particular processor apparatus and organizes it inside a FIFO such as the FIF0 of FIG. 6b which is implemented in desired locations of the data RAM 100. Also, the DFM 600 takes data in a FIFO, and organizes it for output to a serial output port of the digital signal processor 10. The DFM is also capable of directing data into a FIFO and drawing data from a FIFO at desired speeds so as to accommodate a decimation operation performed by the digital signal processor. Further, the DFM causes decoder 196 to place signals onto the flag bus 198 (and hence to the event occurrence circuitry 460 of the GSPs 400) regarding the status of the buffers.

The circuitry for receiving data from a serial port and organizing it for storage in a FIFO of the data RAM 100 is seen in FIG. 4a. The data flow itself is simple, with the data being sent from the serial port 700, via multiplexer 611 and tri-state driver 613 to the data slots of the data RAM bus 125. Multiplexer 611 permits either data coming from serial port 700a or data generated as hereinafter described to be forwarded to driver 613. Driver 613 is controlled as indicated such that data is only output on the data RAM bus 125 when the DFM 600 is enabled by the system-wide multiplexer clock scheme. The organization of the data for output onto the data RAM bus as a twenty-four bit word is conducted by the serial port 700, as hereinafter described.

Besides the data flow circuitry, each DFM is arranged with buffers, counters, gates, etc. to generate data RAM FIFO addresses for the incoming data. As shown in FIG. 4a, the DFM 600 has three registers 620, 622, 624, three counters 630, 632, and 634 associated with the three registers, an adder 636, a divide by two block 637, a multiplexer 638, seven logic gates 641, 642, 643, 644, 645, 646, and 647 (gates 642, 643, 645, and 647 being bus wide gates), and two delay blocks 648 and 649. The three registers are respectively: the start of FIFO register 620 which stores the start location in the data RAM for the FIFO to be addressed by the particular serial port coupled to the particular part of the DFM; the index length register 622 which stores the number of buffers which comprise the FIFO (for the FIFO of FIG. 4b, the index length register would be set at four), and the buffer length register 624 which stores the length of each buffer, i.e. the number of words that may be stored in each buffer (for the FIFO of FIG. 4b, the buffer length register would be set at eight). When a data word (twenty-four bits) is ready for sending to the data RAM for storage in a FIFO, the serial port 700a provides a ready signal which is used as a first input to AND gate 641. The second input to AND gate 641 is a data enable signal which is the time division multiplexed signal which permits the DFM to place a word on the data RAM bus. With the data enable and ready signals high, a high signal is output from the AND gate which causes driver 613 to output the data on the data RAM bus along with an address. The address is that which is computed by the twelve bit adder 636, or a prewired address (e.g. one of addresses 0800 through 0813 Hex), as will be described hereinafter.

When AND gate 641 provides a high output, the high output is delayed by delay blocks 648 and 649 before being input into clock counters 630 and 634. As a result, counters 630 and 634 increase their counts after an address has been output on the data RAM bus. When counter 630 increases its count, its count is added by the twelve bit adder 636 to the FIFO start location stored in register 620. If selected by multiplexer 638, the generated address will be the next address output in the address slots of the data RAM bus in conjunction with the data provided by driver 613. Thus, as data words continue to be sent by the serial port for storing in the data RAM FIFO, they are sent to incremental addresses of the data RAM, as the counter 630 increasingly sends a higher value which is being added to the FIFO start location. As is hereinafter discussed, the counter 630 continues to increase its count until a clear counter signal is received from circuitry associated with the index length register 622. When the clear counter signal is received, the counter starts counting again from zero.

As aforementioned, each time the AND gate 641 provides a high output, the counter 634 associated with the buffer length register 624 is also incremented (after delay). The outputs of the buffer length register 624 and its associated counter 634 are provided to bus wide XNOR gate 643 which compares the values. When the counter 634 reaches the value stored in the buffer length register 624, a buffer in the data RAM FIFO has been filled. As a result, the output of XNOR gate 643 goes high, causing three input OR gate 644 to pass a high signal to the reset of counter 634. The high signal from bus wide XNOR gate 643 is also fed to the counter 632 associated with the index length register 622, to the multiplexer 638, and to the multiplexer 611. As a result of the buffer being filled, multiplexer 638 enables the prewired address to be placed in the address slots of the data RAM bus 125, along with one of two predetermined (or generated) data words which are generated as discussed below. The placement of the prewired address and a data word on the bus at the end of buffer signal occurs upon the next data enable signal received by the DFM, which is before another word is assembled by the serial port 700a for sending to the data RAM 100. Also, the placement of the prewired address and data word is used for signalling purposes, as a decoder 196 (seen in FIG. 1) monitors the data RAM bus 125 for the particular prewired addresses of the DFMs; the triggering of these addresses occurring because of conditions in the DFM, i.e. the filling of buffers. The decoder 196 in turn, can set a flag (the setting of the flag can be dependent on the value of the data accompanying the prewired address) on the trigger bus 198 which signals the GSPs 400 of the digital signal processor of the occurrence. In this manner, the GSPs 400 can determine that the data required to conduct an operation is available to the GSP, thereby causing the GSP to exit a wait loop or to change its execution course such as by branching.

The predetermined or generated data word placed on the bus after a FIFO buffer has been filled preferably uses a "1" as the msb of the data word if the FIFO buffer that has been filled causes the FIFO to be half filled (as described hereinafter), or a "0" as the msb otherwise. The remainder of the data word may be null information. Or, if desired, the data word may include the next location to which the DFM will write (i.e. the location computed by the twelve bit adder 636) which is inserted in appropriate locations of the data word. This predetermined or generated data word is then passed via multiplexer 611 to driver 613 which places the data word on the bus at the same time the prewired address is placed on the data RAM bus 125.

As aforementioned, when an indication of a full buffer is output by bus wide XNOR gate 643, counter 632 is incremented. Counter 632 therefore tracks the number of the buffer in the FIFO that is being filled. When the number of the FIFO buffer being addressed (as determined by counter 632) is half of the FIFO length (as determined by the length stored in register 622, divided by divide by two block 637), a flag is raised by the DFM via the bus wide XNOR gate 647. The "mid buffer" flag indicates that the buffer in the FIFO being written to is halfway through the FIFO. Hence, if all previous buffers in the FIFO are still full with data, the FIFO is half full. In addition, the mid buffer flag causes the generated data input to multiplexer 611 to be changed, such that the msb of the data is a "1" instead of a zero. Thus, upon filling the buffer which causes the FIFO to be half filled, a slightly differently coded data word is placed in the data slots of the data RAM bus.

When the value of counter 632 is incremented to the value stored in the index length register 622, the last location in the FIFO has been addressed. Accordingly, it is desirable to recirculate; i.e. to continue by addressing the first location in the FIFO. With the value of counter 632 equal to the value of register 622, bus wide XNOR gate 645 provides a high signal which is passed through three input OR gate 646. As a result, counters 630, 632, and 634 are reset. As indicated in FIG. 6a, a "clear counter" signal may also be generated by a power up reset (PUR) signal which is generated by applying a signal to a predetermined pin (not shown) of the digital signal processor, and by a SYNC signal which is generated by writing to address 0405H of the data RAM 100. The SYNC signal permits different DFMs to be synchronized to each other.

The input section of one DFM can be synchronized to the output section of the same or another DFM. This synchronization is accomplished via a pin (not shown) on the digital signal processor which generates the "enbuf" input into OR gate 644. In turn, OR gate 644 provides a high signal which resets counter 634 in synchronization with the resetting of a similar counter in a DFM output section, details of which may be obtained by reference to parent application Ser. No. 07/525,977.

Turning to FIG. 4b, an example of a FIFO associated with the DFM is seen. The FIFOs associated with DFMs are contained in a preferably predetermined portion of the data RAM of the processor apparatus. The FIFO of FIG. 4b, as shown contains four buffers. Also as shown, each buffer contains storage for eight data samples. Thus, as shown, the FIFO of FIG. 4c has storage for thirty-two data samples. A FIFO can contain a different number of buffers, and the buffers can store different numbers of data samples. The size of the each FIFO associated with a DFM and the size of its buffers is either set automatically by intelligent software which calculates the requirements of the particular DFM, or by the user of the processor system during initial programming of the processor system.

Figure 5A:
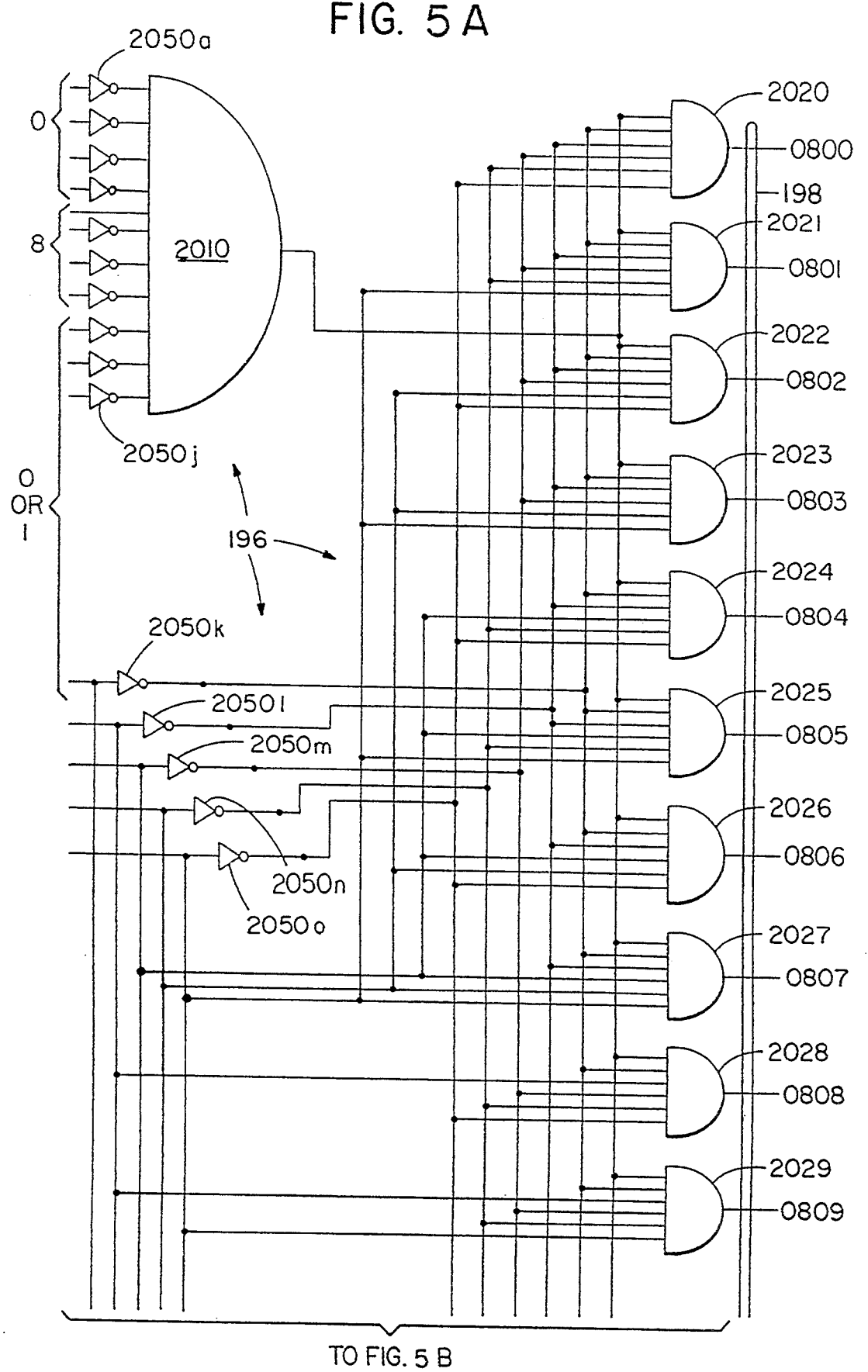
FIGS. 5A and 5B, is a circuit diagram of the data RAM bus address decoder of the event signalling system invention.
Figure 5B:
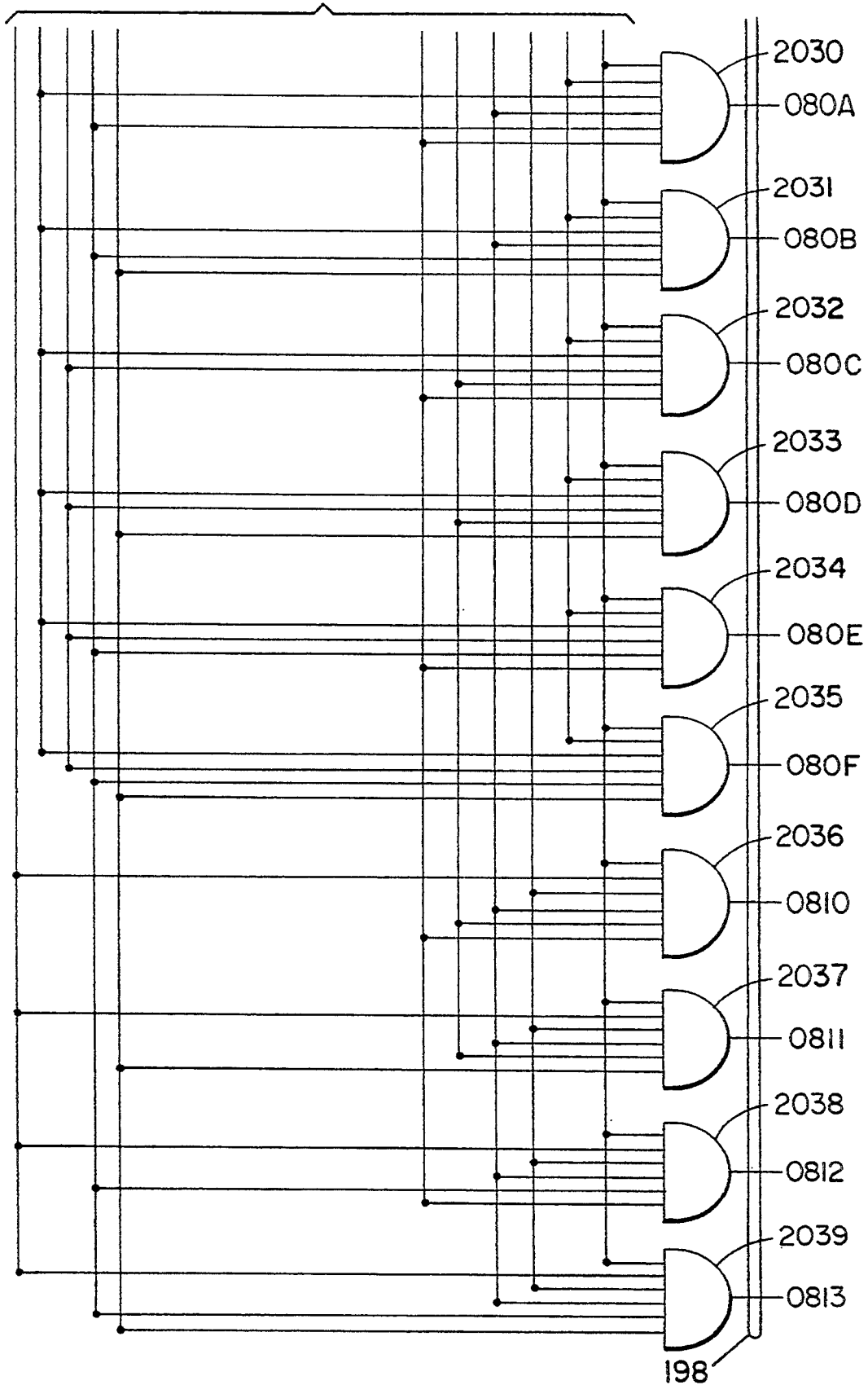

As hereinbefore described, whenever a DFM writes data to the data FIFO of the data RAM and in so doing fills a buffer, the DFM is configured in its hardware to immediately generate and write a predetermined address to the address lines of data RAM bus 125. The predetermined addresses to which the DFMs write is monitored by data RAM bus decoder 196. As seen in FIGS. 5A and 5B, the decoder 196 is logically comprised of an eleven input AND gate 2010, twenty six input NAND gates 2020-2033, and fifteen inverters 2050a-2050o. The first four bits of the twenty-four bit data address written to the address lines of the data RAM bus 125 are inverted by inverters 2050a-2050d to select for hexadecimal "0". The fifth bit of the address is passed directly to AND gate 2010, while the sixth through eighth bits are inverted by inverters 2050e-2050g; the fifth through eighth bits for selecting the hex address "8". The ninth through eleventh bits are inverted by inverters 2050h-2050j to select in conjunction with a twelfth bit a hexadecimal "0" or "1" and the last five bits (the twelfth through sixteenth bits) are inverted by inverters 2050k-2050o, and the uninverted and inverted states of the last five bits are provided in different combinations, along with the output of AND gate 2010, to the six input NAND gates to provide an appropriate negative output on trigger bus 198 should any of addresses 0800-0813 be placed on the data bus 125 (i.e. received by the decoder 196).

Returning to FIG. 1, when the digital signal processor 10 is operating, serial data flow into and out of the digital signal processor is primarily through the serial ports 700, while parallel data flows through the host port 800. Serial data which is to be processed is sent into an input port 700 which is coupled to a DFM 600, which in turn forwards the data to appropriate locations (buffers) in the data RAM 100 via the time division multiplexed data RAM bus 125. Whenever the data word being written by the DFM to the data RAM 100 completes the filling of a buffer, the DFM 600 also writes additional information to a predetermined data RAM location which is monitored by flag generating decoder 196. Decoder 196, in turn, causes a flag or signal to be written on the trigger or flag bus 198 to inform the GSPs, and if desired the output sides of the DFMs of the occurrence of the event (buffer filled).

There have been described and illustrated herein event signalling systems for a digital signal processor apparatus. It will be appreciated by those skilled in the art that the method invention for signalling events occurring in a digital signal processor apparatus is related directly to the event signalling system so described. It will also be appreciated that while particular embodiments have been described, it is not intended that the invention be limited thereto as it is intended that the invention be as broad in scope as the art will allow. Thus, while the decoder was described as decoding a certain number of particular predetermined addresses, it will be appreciated that the decoder could be a programmable decoder such that different addresses can be monitored, and the decoder can be arranged to decode any number of addresses. Further, while a single decoder for the address section of the time division multiplexed data RAM bus is provided, where the data RAM is a true multiported data RAM, and each of the GSPs, DFMs, etc. have their own data RAM bus which accesses the data RAM, it will be appreciated that the decoder must monitor each of those buses. Also, while the DFMs (I/O processors) were described as having hardwired circuitry for generating predetermined address code, while the GSPs (computing processors) were described as having software means of generating predetermined address code, it will be appreciated that the GSPs could include hardwired circuitry such as the DFMs. Moreover, while not preferred, the DFMs could be provided with logic circuitry and a program memory, such that the DFMs could generate address code in a manner similar to the GSPs. It will also be appreciated that while particular circuitry for the decoder and the address generating circuitry of the DFMs was set forth, it is well within the ability of those skilled in the art to provide other circuitry for accomplishing the same or similar functions. Therefore, it will be appreciated by those skilled in the art that yet other modifications could be made to the provided invention without deviating from its spirit and scope as so claimed.

We claim:

1. An event signalling system for a digital signal processor apparatus which has a central data RAM having a plurality of data buffers, a data RAM bus having address and data lines coupled to the central data RAM, a computing processor coupled to said central data RAM, and a data I/O processor coupled to the data RAM bus, wherein said data I/O processor receives data from external said digital signal processor apparatus and writes that data via said data RAM bus to at least one of said data buffers of said central data RAM associated with said I/O processor, the event signalling system comprising:

a) address code generating means in said data I/O processor for generating a predetermined address code other than an address code of said at least one data buffer associated with said I/O processor and for writing said predetermined address code onto said address lines of said data RAM bus each time said data I/O processor fills its associated at least one data buffer;

b) a data RAM bus address decoder coupled to said address lines of said data RAM bus for monitoring said address lines of said data RAM bus for said predetermined address code, and for generating a signal when said predetermined address code is written to said address lines of said data RAM bus;

c) event occurrence circuitry in said computing processor, wherein said computing processor writes to and reads from said central data RAM; and d) a flag bus coupled to said data RAM bus address decoder and to said event occurrence circuitry, for transmitting said signal generated by said data RAM bus address decoder to said event occurrence circuitry of said computing processor to indicate to said computing processor the occurrence of the filling of a said data buffer associated with said I/O processor as indicated by said I/O processor, wherein said signal generated by said data RAM bus address decoder to said event occurrence circuitry is broadcast over said flag bus, and said event occurrence circuitry which receives said broadcast signal permits said computing processor to ascertain that said at least one data buffer associated with said I/O processor has been filled.

2. An event signalling system according to claim 1, wherein:

said digital signal processor comprises a plurality of I/O processors each having their own address code generating means, said data RAM bus is a time division multiplexed data RAM bus coupled to each of said plurality of I/O processors, each respective address code generating means generates a different predetermined address code, and said data RAM bus address decoder monitors said address lines of said time division multiplexed data RAM bus for each of said different predetermined address codes.

3. An event signalling system according to claim 2, wherein:

said data RAM bus address decoder generates a different signal for each different predetermined monitored address code which is written to said data RAM.

4. An event signalling system according to claim 3, wherein:

each address code generating means comprises hardwired circuitry for generating different predeteremined address codes, wherein said data RAM bus address decoder monitors each of said predetermined address codes.

5. An event signalling system according to claim 4, wherein:

said digital signal processor comprises a plurality of computing processors, each computing processor including its own second address code generating means for generating different predetermined second address codes upon the occurrence of different events of interest, each computing processor is coupled to and reads from and writes to said central data RAM via said data RAM bus, said data RAM bus address decoder monitors said address lines of said time division multiplexed data RAM bus for each of said different second address codes, and each computing processor has its own event occurrence circuitry coupled to said flag bus, wherein signals generated by said data RAM bus address decoder are broadcast over said flag bus to said event occurrence circuitry of each computing processor and said signals generated by said RAM bus address decoder correspond to said occurrence of different events of interest.

6. An event signalling system according to claim 5, wherein:

said broadcast signal is used by said event signalling system to synchronize at least two of said plurality of computing processors.

7. An event signalling system according to claim 4, wherein:

each said address code generated is a data RAM address.

8. An event signalling system according to claim 4, wherein:

said I/O processor includes its own event occurrence circuitry, and said flag bus is coupled to the event occurrence circuitry of said I/O processor, wherein said signal generated by said data RAM bus address decoder to said event occurrence circuitry is broadcast over said flag bus.

9. An event signalling system according to claim 2, wherein:

said digital signal processor comprises a plurality of computing processors, each computing processor including its own second address code generating means for generating different predetermined second address codes upon the occurrence of different events of interest, each computing processor is coupled to and reads from and writes to said central data RAM via said data RAM bus, said data RAM bus address decoder monitors said address lines of said time division multiplexed data RAM bus for each of said different second address codes, and each computing processor has its own event occurrence circuitry coupled to said flag bus, wherein signals generated by said data RAM bus address decoder are broadcast over said flag bus to said event occurrence circuitry of each computing processor.

10. An event signalling system according to claim 9, wherein:

said broadcast signal is used by said event signalling system to synchronize at least two of said plurality of computing processors.

11. An event signalling system according to claim 2, wherein:

said broadcast signal is used by said event signalling system to distribute timing information throughout said event signalling system.

12. An event signalling system according to claim 1, wherein:

said address code generating means comprises hardwired circuitry for generating said predetermined address code, wherein said data RAM bus address decoder monitors said predetermined address.

13. An event signalling system according to claim 1, wherein:

said digital signal processor .comprises a plurality of computing processors, each computing processor including its own second address code generating means for generating different predetermined second address codes upon the occurrence of different events of interest, each computing processor is coupled to and reads and writes to said central data RAM via said data RAM bus, said data RAM bus is a time division multiplexed data RAM bus, said data RAM bus address decoder monitors said address lines of said time division multiplexed data RAM bus for each of said different second predetermined address codes, and each computing processor has its own event occurrence circuitry coupled to said flag bus, wherein signals generated by said data RAM bus address decoder in response to said second address codes are broadcast over said flag bus to said event occurrence circuitry of each computing processor.

14. An event signalling system according to claim 13, wherein:

each said predetermined address,code is a data RAM address.

15. An event signalling system according to claim 13, wherein:

said broadcast signal is used by said event signalling system to synchronize at least two of said plurality of computing processors.

16. An event signalling system according to claim 1, wherein:
said predetermined address code generated by said address code generating means is a data RAM address.

17. An event signalling system according to claim 1, wherein:
said digital signal apparatus comprises a plurality of I/O processors each having their own address code generating means,
said central data RAM is a multiported central data RAM,
said digital signal apparatus comprises a plurality of data RAM buses each having address and data lines, wherein each of said plurality of I/O processors is coupled to said central multiported central data RAM via a respective data RAM bus, and
said data RAM bus address decoder monitors each of said data RAM buses.

18. An event signalling system according to claim 17, wherein:
said data RAM bus address decoder generates a different signal for each different monitored predetermined address code which is written to said data RAM.

19. An event signalling system according to claim 18, wherein:
said I/O processor includes its own event occurrence circuitry, and said flag bus is coupled to the event occurrence circuitry of said I/O processor, wherein said signal generated by said data RAM bus address decoder to said event occurrence circuitry is broadcast over said flag bus.

20. An event signalling system according to claim 17, wherein:
said digital signal processor apparatus comprises a plurality of computing processors, each computing processor including its own second address code generating means for generating different predetermined second address codes upon the occurrence of different events of interest,
each computing processor is coupled to and reads from and writes to said central data RAM via said data RAM bus,
said data RAM bus address decoders monitors said address lines of said time division multiplexed data RAM bus for each of said different second address codes, and
each computing processor has its own event occurrence circuitry coupled to said flag bus, wherein signals generated by said data RAM bus address decoder are broadcast over said flag bus to said event occurrence circuitry of each computing processor.

21. An event signalling system according to claim 1, wherein:
said I/O processor includes its own event occurrence circuitry, and said flag bus is coupled to the event occurrence circuitry of said I/O processor, wherein said signal generated by said data RAM bus address decoder to said event occurrence circuitry is broadcast over said flag bus.

22. A method for signalling the occurrence of an event in a digital signal processor apparatus which has a central data RAM having a plurality of data buffers, a data RAM bus having address and data lines coupled to the central data RAM, a computing processor coupled to said central data RAM wherein said computing processor reads to and writes from said central data RAM, a data I/O processor coupled to the data RAM bus, wherein said data I/O processor receives data from external said digital signal processor and writes that data via said data RAM bus to at least one of said data buffers of said central data RAM associated with said I/O processor, a decoder coupled to said address lines of said data RAM bus, and a flag bus coupling said decoder and said computing processor, the method comprising:
a) generating in said data I/O processor a predetermined address code other than an address code of said at least one data buffer associated with said I/O processor, and writing said predetermined address code onto said address lines of said data RAM bus each time said data I/O processor fills its associated at least one data buffer;
b) monitoring with said decoder said address lines of said data RAM bus for said predetermined address code;
c) generating in said decoder a signal when said predetermined address code is written to said data RAM bus; and
d) broadcasting said signal over said flag bus to at least said computing processor to signal the occurrence of the filling of said data buffer associated with said I/O processor, thereby permitting said computing processor to ascertain that said at least one data buffer associated with said I/O processor has been filled.

23. A method for signalling according to claim 22, wherein said data RAM bus is a time division multiplexed data RAM bus, and said computing processor is coupled to said central data RAM via said data RAM bus, said method further comprising:
e) generating in said computing processor a second address code and writing said second address code onto said address lines of said data RAM bus upon the occurrence of a second event of interest, wherein
said monitoring step includes monitoring for said second address code,
said generating step includes generating a second signal when said second address code is written to said data RAM bus, and
said sending step includes sending a second signal over said flag bus to signal the occurrence of the second event of interest.

* * * * *